US00RE44137E

(19) United States
(12) Reissued Patent
Okanoue

(10) Patent Number: US RE44,137 E
(45) Date of Reissued Patent: *Apr. 9, 2013

(54) PACKET CONFIGURING METHOD AND PACKET RECEIVER

(75) Inventor: Kazuhiro Okanoue, Tokyo (JP)

(73) Assignee: NEC Corporation, Tokyo (JP)

( * ) Notice: This patent is subject to a terminal disclaimer.

(21) Appl. No.: 11/447,278

(22) Filed: Jun. 6, 2006

Related U.S. Patent Documents

Reissue of:
(64) Patent No.: 6,738,375
Issued: May 18, 2004
Appl. No.: 09/347,774
Filed: Jul. 6, 1999

U.S. Applications:
(63) Continuation of application No. 11/301,328, filed on Dec. 13, 2005, now Pat. No. Re. 39,981.

(30) Foreign Application Priority Data

Jul. 8, 1998 (JP) ..... 10-192219

(51) Int. Cl.
*H04L 12/28* (2006.01)

(52) U.S. Cl. ..... 370/389

(58) Field of Classification Search ..... 370/389, 370/480, 467, 276, 465, 352, 401, 210, 400, 370/395, 392, 342, 347, 202, 394, 208, 474, 370/310, 316, 335, 476; 375/299, 267, 147, 375/231, 148, 149, 130, 343, 326, 232, 233, 375/206, 200, 234, 368; 340/825.49; 379/406; 704/223; 123/436; 455/452
See application file for complete search history.

(56) References Cited

U.S. PATENT DOCUMENTS 4,621,366 A * 11/1986 Cain et al. ..... 375/222
4,868,850 A * 9/1989 Kaku et al. ..... 375/231
(Continued)

FOREIGN PATENT DOCUMENTS

EP 0 851 602 A2 7/1998
JP 3-254255 11/1991
(Continued)

OTHER PUBLICATIONS

Japanese Office Action issued Mar. 13, 2001 (w/ English translation of relevant portion).

*Primary Examiner* — Hassan Phillips
*Assistant Examiner* — Prenell P Jones
(74) *Attorney, Agent, or Firm* — Dickstein Shapiro LLP

(57) ABSTRACT

A packet receiver is provided that accurately estimates a frequency offset and a channel impulse response even when a transmitted packet is detected with an erroneous timing in a communication mode (typified by the LAN (local Area Network)) where packets are asynchronously transmitted, and thus provides a training sequence which can demodulate the received packet. The training sequence 101 is formed of K sequences 100-1 to 100-K serially connected, each formed of the same N symbols. Even in a channel where a inter-symbol interference occurs when such a training sequence is used, a received signal shifted by the time corresponding to N-symbols becomes the signal which is different by a phase difference caused by a frequency offset between the transmitter and the receiver. Thus, even if the head of a packet is detected with an erroneous timing, the frequency offset can be estimated.

12 Claims, 8 Drawing Sheets

U.S. PATENT DOCUMENTS

| | | | | | |
|---|---|---|---|---|---|
| 5,129,379 | A * | 7/1992 | Kaneyasu et al. | 123/436 |
| 5,414,734 | A | 5/1995 | Marchetto et al. | |
| 5,475,710 | A * | 12/1995 | Ishizu et al. | 375/232 |
| 5,751,768 | A * | 5/1998 | Guglielmi et al. | 375/234 |
| 5,793,250 | A * | 8/1998 | Fukushi | 329/307 |
| 5,848,151 | A * | 12/1998 | Boudy et al. | 379/406.13 |
| 5,889,474 | A * | 3/1999 | LaDue | 340/825.49 |
| 5,909,462 | A * | 6/1999 | Kamerman et al. | 375/147 |
| 6,044,339 | A * | 3/2000 | Zack et al. | 704/223 |
| 6,049,577 | A * | 4/2000 | Gothe et al. | 375/368 |
| 6,112,094 | A * | 8/2000 | Dent | 455/452.1 |
| 6,363,084 | B1 * | 3/2002 | Dejonghe | 370/480 |
| 6,373,858 | B1 * | 4/2002 | Soleimani et al. | 370/476 |
| 6,408,330 | B1 * | 6/2002 | DeLaHuerga | 709/217 |
| 6,414,936 | B1 * | 7/2002 | Cho et al. | 370/208 |
| 6,470,030 | B1 * | 10/2002 | Park et al. | 370/480 |
| 6,546,055 | B1 * | 4/2003 | Schmidl et al. | 375/244 |

FOREIGN PATENT DOCUMENTS

| | | |
|---|---|---|
| JP | 6-252966 | 9/1994 |
| JP | 8-223240 | 8/1996 |
| JP | 2600970 | 1/1997 |
| JP | 10-163816 | 6/1998 |

* cited by examiner

PACKET CONFIGURING METHOD AND PACKET RECEIVER

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,738,375. The reissue applications are U.S. Reissue application Ser. No. 11/447,278 (the present application), which is a continuation of Reissue application Ser. No. 11/301,328, filed Dec. 13, 2005, now U.S. Pat. No. Re. 39,981, issued Jan. 1, 2008, which itself is a Reissue of U.S. Pat. No. 6,738,375.*

BACKGROUND OF THE INVENTION

The present invention relates to a packet configuring method and a packet receiver. Particularly, the present invention relates to a packet configuring method and a packet receiver, each for configuring a packet that contains training sequences in an asynchronous packet communication mode.

FIG. 7 is a diagram illustrating a down-link control channel frame used for the conventional digital automobile telephone, described ETSI/GSM, "Recommendation GSM 05.02 Multiplexing and Multiple Access on the Radio Path", version 3.3.0, 15, Apr., 1989. FIG. 7 shows an example of a 10-channel configuration being the head of a frame. This frame is formed of a frequency connection channel (FCCH) 1000, a synchronization channel (SCH) 1001 and a broadcast channel (BCCH) 1002. The slot forming SCH 1001 or BCCH 1002 is formed of the training portion 1011 and the data portions 1010 sandwiched by the training portion 1011. The frequency connection channel FCCH 1000 is formed of a sine wave signal with a single frequency.

The mobile station that receives the control channel operates as follows: First, the mobile station receives FCCH 1000 and then corrects a variation in frequency (frequency offset) between a transmitter and a receiver. Then, the mobile station demodulates the synchronization channel SCH 1001 and the broadcast channel BCCH 1002.

SCH 1001 and BCCH 1002 are demodulated as follows: First, a channel impulse response is obtained using the training portion 1011. SCH 1001 and BCCH 1002 are demodulated by setting the reception parameter for the receiver based on the resultant channel impulse response. That is, the training portion 1011 is used for the initializing of the receiver.

According to the conventional art described above, frequency offset compensation and channel impulse response estimation necessary for signal reception are differently obtained.

In the automobile telephone system where communications are not always established through a base station but either communications via the base station or direct communications between terminals are established, for example, in local area networks (LANs), there is the possibility that different signal transmission sources are used for respective packets. This requires the receiver to execute frequency offset compensation and channel impulse response estimation every packet reception. In such a case, it may be considered, as shown in FIG. 8, that both the sequences 1020 for frequency offset estimation and the sequences 1021 for channel impulse response estimation are contained in the training sequences.

There is the method where the receiver monitors, for example, the reception power and the packet transmission to detect a transmitted packet in an asynchronous packet transmission and detects when the reception power exceeds a predetermined threshold value. In this case, the head of a packet cannot be already received accurately due to influences of noises or radio transmission path. Hence, this method has the disadvantage in that the boundary between the sequence for frequency offset estimation and the sequence for channel impulse response estimation may not be recognized.

Moreover, the method has the disadvantage in that the length of a training sequence is prolonged using the sequence for frequency offset estimation and the sequence for channel impulse response estimation, whereby the transmission efficiency is degraded.

SUMMARY OF THE INVENTION

The present invention is made to solve the above-mentioned problems.

Moreover, the objective of the invention is to provide a packet configuration method that correctly estimates an estimate frequency offset and a channel impulse and then demodulates a received packet even when a transmitted packet is erroneously detected in timing in the communication mode where packets are asynchronously transmitted.

Another objective of the present invention is to provide a packet receiver that correctly estimates an estimate frequency offset and a channel impulse response and then demodulates a received packet even when a transmitted packet is erroneously detected in timing in the communication mode where packets are asynchronously transmitted.

The objective of the present invention is achieved by a method configuring packets, the packets each having a training portion and a data portion to set a receiver, comprising the step of forming the training portion by serially connecting K sequences (where K is an integer of 2 or more), each of the K sequences being formed of N symbols (where N is an integer of 2 or more).

According to the present invention, a packet receiver receives packets each which is formed of a training portion and a data portion to initialize of the receiver. The packet receiver comprises frequency-offset estimation means for estimating a frequency offset based on a received packet, frequency-offset compensation means for compensating a frequency offset contained in the received packet based on the frequency offset estimation value, and channel impulse response estimation means for estimating an impulse response of a channel based on an output of which the frequency offset is compensated.

That is, the same sequences, each formed of N symbols, are repeatedly used in a communication mode where packets are asynchronously transmitted. Thus, the frequency offset can be estimated by detecting the phase difference between a signal received before NT and a currently-received signal.

In a packet formed of a training portion and a data portion to initialize a packet receiver according to the present configuring method, the training portion has K sequences chained, each being formed of N symbols, to estimate a frequency offset and a channel impulse response. The auto-correlation function of a sequence formed of N symbols is in an impulse state.

Moreover, the packet receiver comprises a frequency offset estimation circuit for estimating a frequency offset of a received signal and then outputting a frequency offset estimation value, a frequency offset compensation circuit for receiving the frequency offset estimation value and the received signal and compensating a frequency offset contained in the received signal based on a frequency offset estimation value, and a channel impulse response estimation circuit for receiving an output from the frequency offset compensation circuit, estimating a channel impulse response, and then outputting the channel impulse response estimation value after inputting a frequency offset estimation completion pulse.

The frequency offset estimation means comprises a delay circuit for receiving a received signal and delaying the received packet by a transmission period of time corresponding to N-symbols; a phase difference detection circuit for detecting a phase difference between an output of the delay circuit and the received packet; an integrator for integrating a detection output of the phase difference detection circuit over a transmission period of time of a sequence of M symbols; and a divider circuit for dividing an output of the integrator by a product of N and M.

According to the present invention, the sequence for estimation of a frequency offset and the sequence for estimation an impulse response are not separated from each other and are defined as repetition of the same sequences. The phase difference between the i-th symbols in each sequence is detected using this configuration, so that the frequency offset can be estimated. This feature allows the frequency offset to be estimated correctly even when a packet is detected with an erroneous timing.

Furthermore, where the auto-correlation function in an impulse state is used as the same sequence, a channel impulse response can be estimated by the simple operation that the receiver examines the correlation between the sequence and a received training sequence.

According to the present invention, since the frequency offset estimation and the channel impulse response estimation can be performed using the same sequences, the frequency offset estimation sequence and the channel impulse response estimation sequence are equivalently overlapped. This configuration can reduce the length of the training sequence.

BRIEF DESCRIPTION OF THE DRAWINGS

This and other objects, features, and advantages of the present invention will become more apparent upon a reading of the following detailed description and drawings, in which.

DESCRIPTION OF THE EMBODIMENTS

Figure 1:
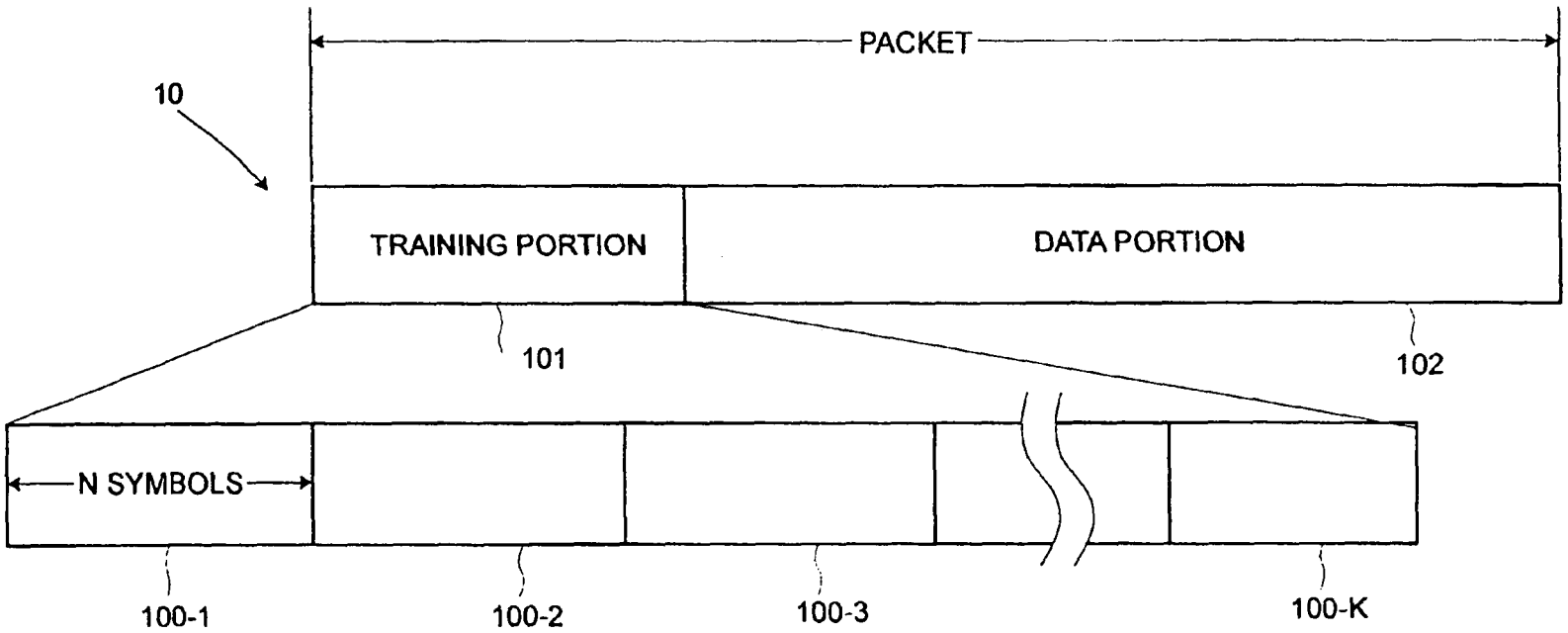
FIG. 1 is a format diagram illustrating a packet having a training sequence which is configured according to the training sequence configuration method of an embodiment of the present invention.

An embodiment of the present invention will be described below with reference to the attached drawings. In the drawings, like numerals represent the same elements.

FIG. 1 is a diagram illustrating a packet format configured according to the packet configuration method of the present invention. Referring to FIG. 1, a packet 10 is formed of a training portion 101 and a data portion 102. The training portion 101 is formed of sequences 100-1 to 100-K each formed of the same N symbols. That is, the training portion is formed of K sequences serially connected, each being formed of N symbols.

As an N symbol sequence, for example, in the case of N=32, the following sequence 1 formed of two symbols including the symbol "1" and the symbol "0" can be used.

Sequence 1: 11111100110101001000001100101000

The sequence 1 is merely represented as an example. Other sequences can be used by arbitrarily combining the symbols "1" and "0".

Figure 2:
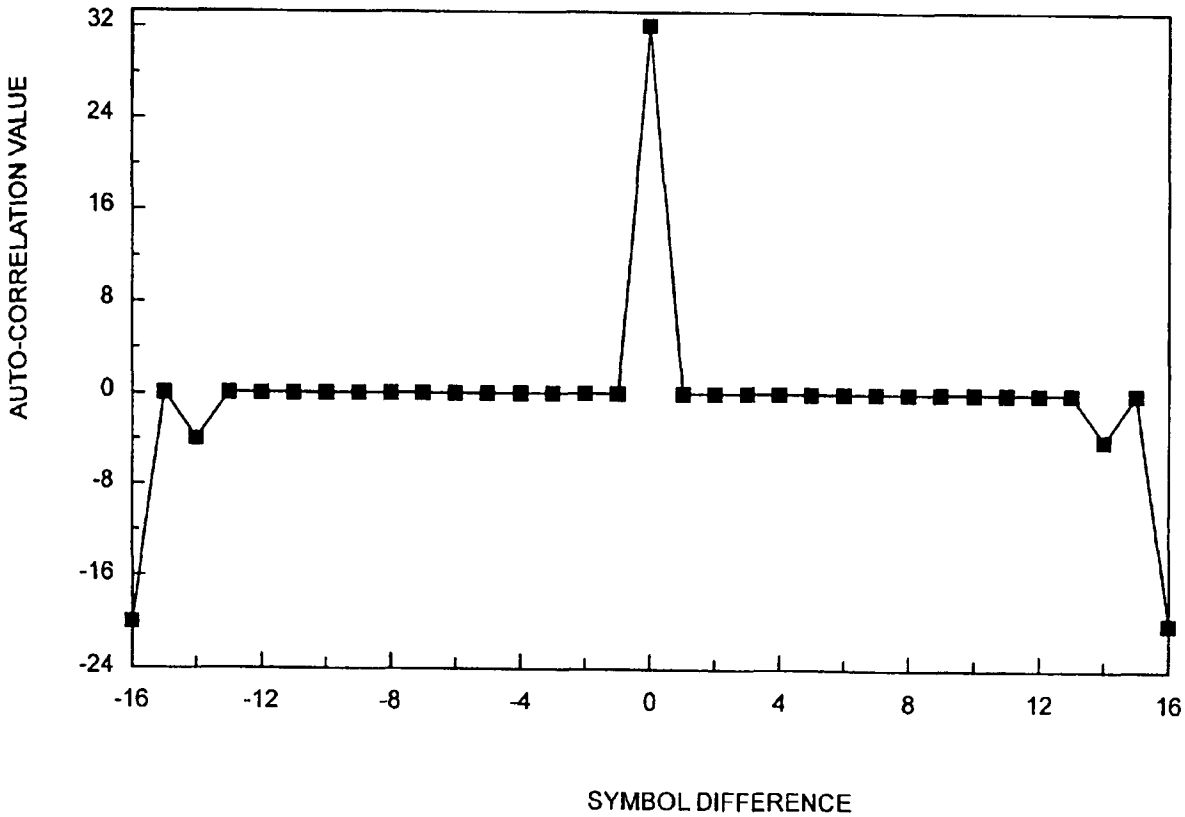
FIG. 2 is a diagram illustrating an auto-correlation function of a sequence of 32 symbols applicable for the training sequence configuring method of the present invention.

In the sequence 1, when the value corresponding to the symbol "1" corresponds to +1 and 0 and the value corresponding to the symbol "0", corresponds to −1 and 0, the auto-correlation function is plotted as shown in FIG. 2.

Figure 3:
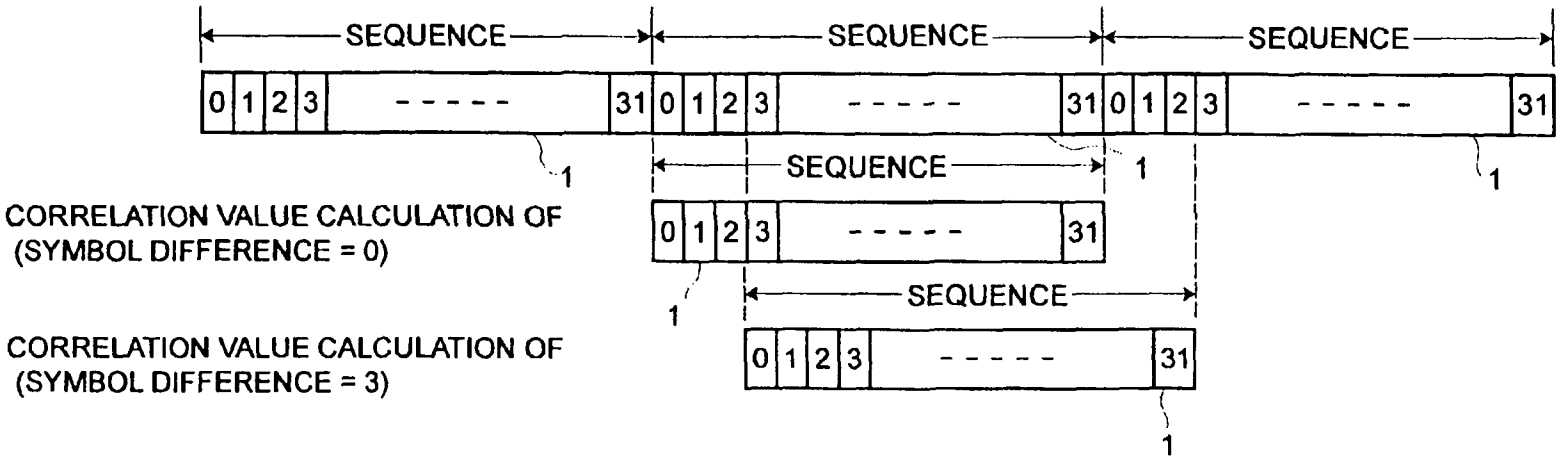
FIG. 3 is a diagram illustrating a principle of obtaining an auto-correlation function.

In FIG. 2, the x-axis represents symbol differences and the y-axis represents auto-correlation values. When the auto-correlation of the sequence 1 is obtained as shown in FIG. 3, it is assumed that the x-axis has a symbol difference of 0 in the case where the sequence 1 is completely in a synchronized state. The symbol numbers where the sequence 1 is shifted to the right represent positive symbol differences. The symbol numbers where the sequence 1 is shifted to the left represent negative symbol differences.

As shown in FIG. 2, the auto-correlation function of the sequence 1 becomes an impulse over a symbol difference value of −13 to +13. By using such a nature and the correlation circuit shown in FIG. 7 disclosed, for example, in Japanese Patent publication No. 2600970 (or U.S. Pat. No. 5,127,025), the channel impulse response can be estimated over the time period corresponding to 13 symbols. This operation allows the received signal and the N-symbol sequence to be correlated. Even when the packet is detected with an erroneous timing, an error of packet detection timing can be absorbed by detecting a peak correlation value.

The frequency offset can be estimated as follows: That is, a transmission symbol is overlapped with another transmission symbol in the channel with time dispersion characteristics, so that a distortion called a inter-symbol interference occurs. Where the channel impulse response on the channel is regarded as constant, that distortion is uniquely decided by the channel impulse response and transmission symbol sequence. In this case, when the same sequences transmitted in series is received, the receiver receives signals subjected to the same distortion.

Figure 4:
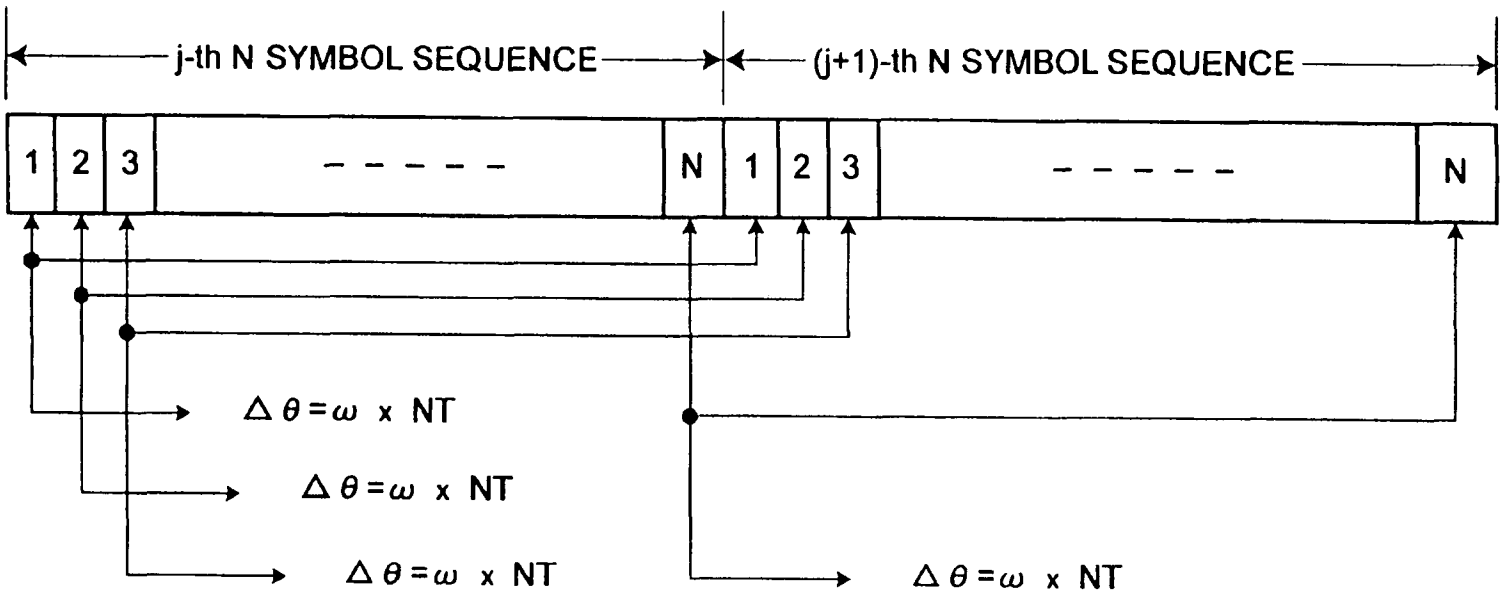
FIG. 4 is a diagram explaining a principle of estimating a frequency offset from the training sequence of FIG. 1.

If there is a frequency offset of $\omega$ between the receiver and the transmitter, the phase difference $\Delta\theta$ between the i-th symbols ($i=1, 2, \ldots, N$) respectively transmitted to the j-th symbol sequence and (j+1)-th symbol sequence, as shown in FIG. 4, is equal to $\omega \times NT$, where T is a continuous time of 1 symbol and is previously determined by a transmission rate.

As described above, the receiver can detect the phase difference between a signal received prior to the time NT and a currently received signal, using as a training sequence a sequence where the same sequences of N symbol are repeatedly chained, so that the frequency $\omega$ can be estimated. That is, the frequency offset is estimated based on a phase difference between two neighboring sequences. Since this operation can executed to any symbol within each N symbol sequence, it is not adversely affected with the detection timing of packet reception.

Figure 5:
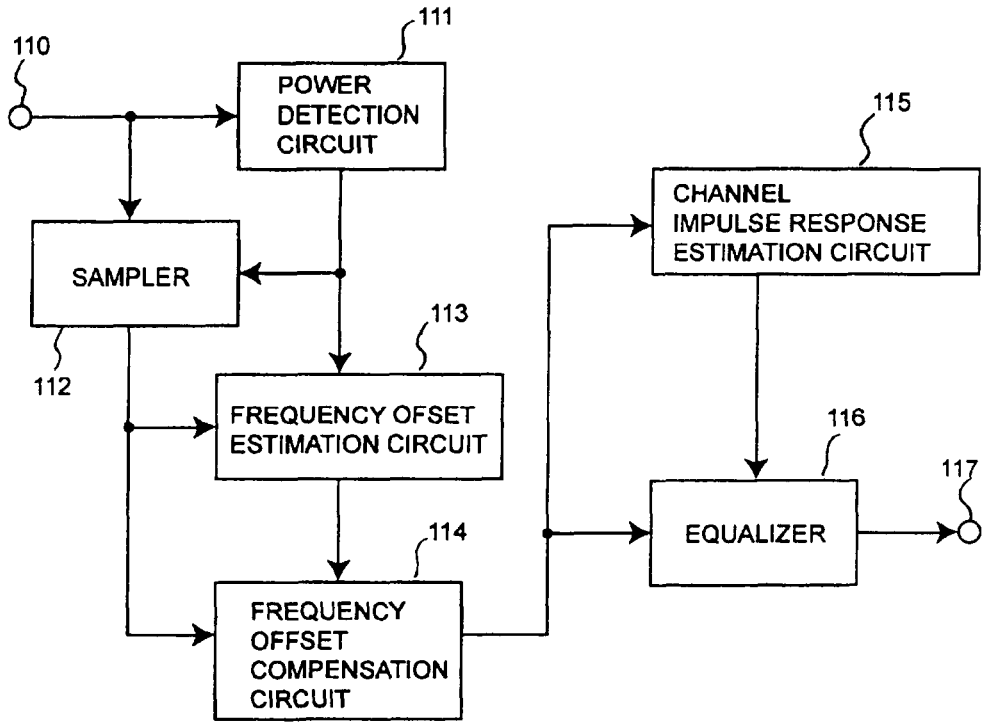
FIG. 5 is a systematic diagram illustrating a receiver that receives packets having the training sequence of FIG. 1.

The configuration of the receiver that performs the above-mentioned operation is shown in FIG. 5. Referring to FIG. 5, the receiver consists of an input terminal 110, a power detection circuit 111, a sampler 112, a frequency offset estimation circuit 113, a frequency offset compensation circuit 114, a channel impulse response estimation circuit 115, an equalizer 116, and an output terminal 117.

A reception signal is input to the power detection circuit 111 and the sampler 112 via the input terminal 110. The power detection circuit 111 detects the power of the received signal. The power detection circuit 111 judges that a packet has been transmitted when the detected power exceeds a predetermined threshold value, and then outputs a packet detection pulse.

The sampler 112 samples the received signal in response to a packet detection pulse. The sampled reception signal is input to the frequency offset estimation circuit 113 and the frequency offset compensation circuit 114.

After the inputting of the packet detection pulse, the frequency offset estimation circuit 113 estimates a frequency offset based on a sampled reception signal and then outputs a frequency offset estimation value. The frequency offset estimation circuit 113 can be configured, for example, as shown in FIG. 6.

Figure 6:
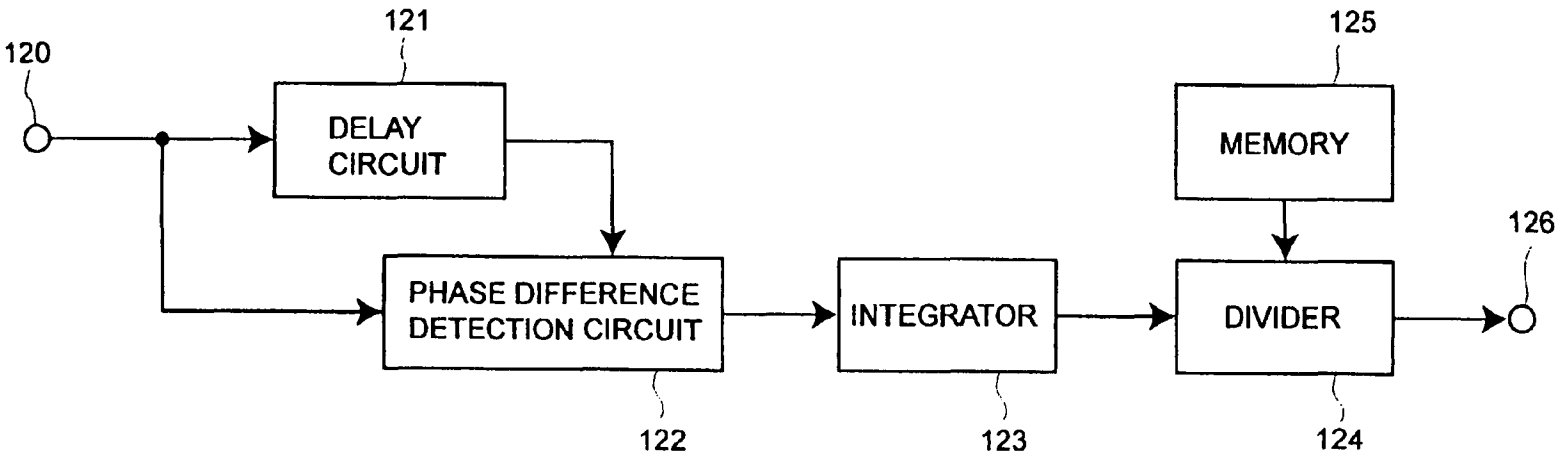
FIG. 6 is a systematic diagram illustrating a frequency offset estimation circuit that estimates a frequency offset based on the training sequence of FIG. 1.

Referring to FIG. 6, the frequency offset estimation circuit 113 consists of an input terminal 120, a delay circuit 121 for delaying an input signal, a phase difference detection circuit 122 for detecting a phase difference between a delayed signal and an input signal, an integrator 123 for integrating a detected phase difference, a memory 125, a divider 124 for dividing the output from the integrator 123 by an output value from the memory, and an output terminal 126.

In such a configuration, a sampled reception signal, or an output signal of the sampler 112, is input to the input terminal 120. Where a 32 symbol sequence 1 is used as a training sequence, the delay circuit 121 delays it by the time period corresponding to 32 symbols being the transfer time of the sequence 1. Since a received signal with a time difference corresponding to 32 symbols is formed of the totally same symbols, the signal shifted by the phase difference is obtained based on the frequency difference when a frequency offset occurs.

The phase difference detection circuit 122 receives the output of the delay circuit 122 and the sampled reception signal input to the input terminal 120 to detect the phase difference between the input signals. In other words, the output of the phase difference detection circuit 122 is equal to a variation in phase ($\Delta\theta$) of the N symbol time produced by the frequency offset, as shown in FIG. 4.

The integrator 123 integrates M outputs from the phase difference detection circuit 122, thus reducing adverse effects due to noises. The output of the integrator 123 becomes a variation in phase corresponding to M×N symbols caused by the frequency offset.

The divider circuit 124 divides the value integrated by the integrator 123 by the constant M×N output from the memory 125. The divider circuit 124 also converts the integrated value of the integrator 123 into the phase rotating within one symbol period by the frequency offset and then outputs the converted value to the output terminal 126.

Figure 7:
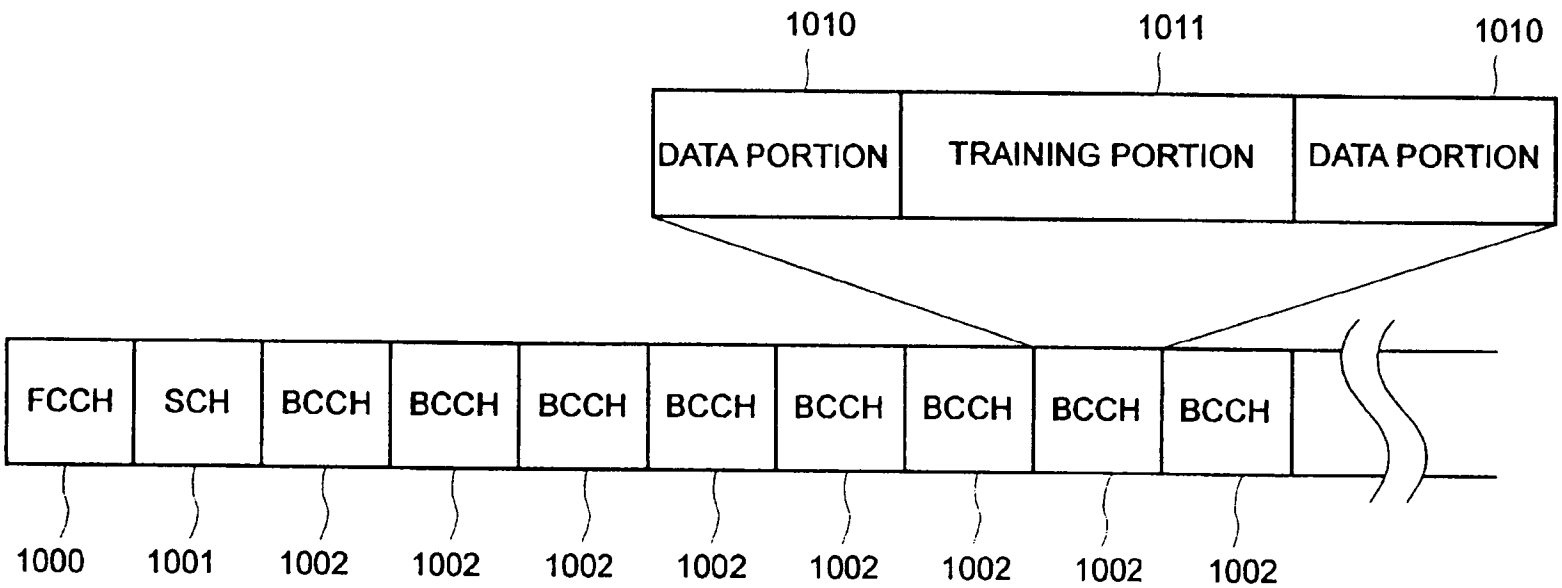
FIG.7 PRIOR ART
FIG. 7 is a diagram illustrating a format of a conventional frame.
Figure 8:
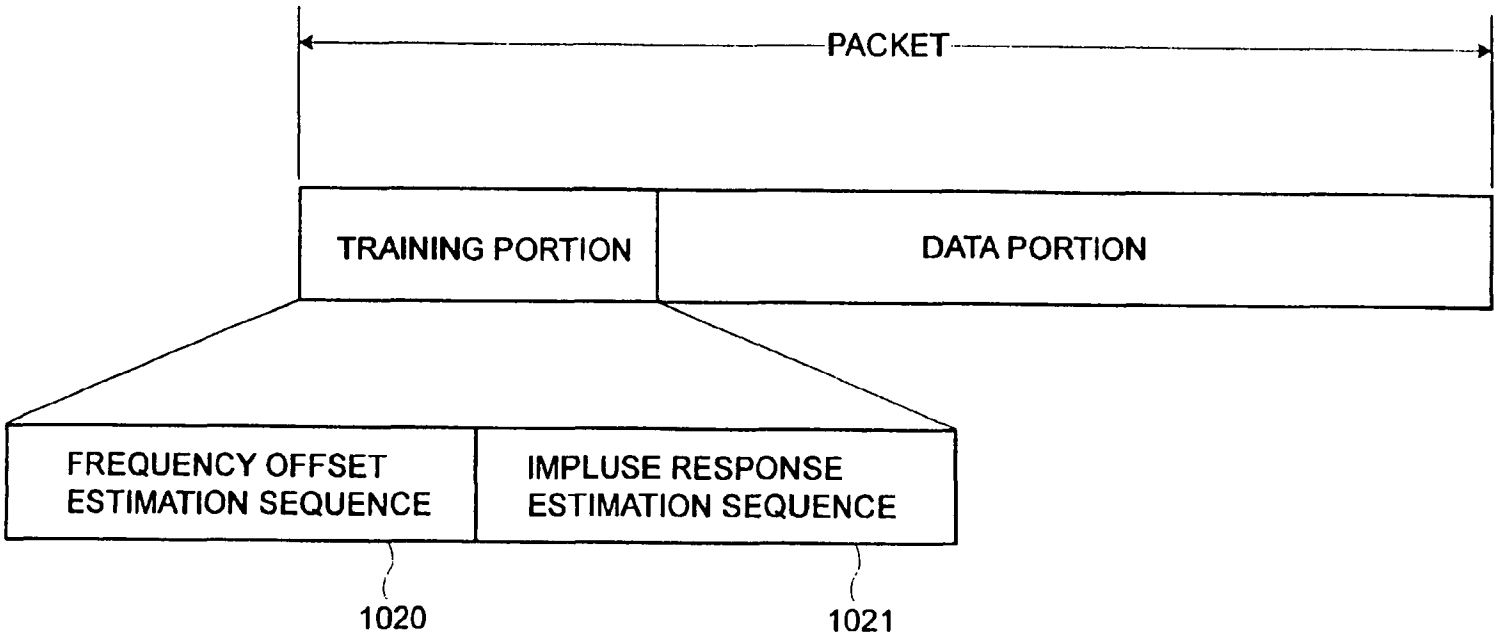
FIG. 8 is a diagram illustrating the format of a packet to estimate a frequency offset and a channel impulse response with a different sequence.

The frequency offset compensation circuit 114 compensates the frequency offset by rotating the phase of a reception signal sampled based on an input frequency offset estimation value in the frequency-offset compensation direction. The frequency-offset compensated signal is input to the channel impulse response estimation circuit 115 and the equalizer 116.

Where the sequence in which the sequence is repeatedly obtained is used as a training sequence, the channel impulse response estimation circuit 115 can be realized using the correlation circuit as shown in FIG. 7, for example, disclosed Japanese Patent publication No. 2600970 (or U.S. Pat. No. 5,127,025). The channel impulse response estimation value is output to the equalizer 116. The channel impulse response estimation value is output after the pulse representing that the frequency offset estimation of the frequency offset estimation circuit 113 has been completed is output.

The equalizer 116 demodulates the sampled reception signal based on the channel impulse response estimation value output from the channel impulse response estimation circuit 115. Japanese patent publication No. 2600970 (or U.S. Pat. No. 5,127,025) discloses the maximum likelihood sequence estimator that configures a replica of a received signal based on a channel impulse response estimation value and all possible transmission symbol sequences and then outputs as a demodulation result a sequence creating a replica most similar to an actual reception signal, in FIGS. 8 to 12. This likelihood sequence estimator can be used as the equalizer 116.

As described above, the present invention can correctly estimate a frequency offset and a channel impulse response even when a transmitted packet is detected with an erroneous timing in an asynchronous packet communication mode, thus demodulating the packet.

According to the present invention, a training sequence is formed by serially connecting sequences, each being formed of the same N symbols. Even in the channel where a intersymbol interference occurs, the reception signal shifted by the N symbol time period corresponds to a signal shifted by a different phase caused by the frequency offset between the transmitter and the receiver, using the training sequence. Hence, the present invention has the advantage in that the frequency offset can be estimated even when the timing of detecting the head of a packet is erroneous.

The entire disclosure of Japanese Application No. 10-192219 filed Jul. 8, 1998 including specification, claims, drawing and summary are incorporated herein by reference in its entirely.

What is claimed is:

1. A method of [configuring packets] *packet transmission in a transmitter*, said packets each including a training portion and a data portion, the method comprising*: said transmitter* forming said training portion by serially connecting K sequences (where K is an integer of 2 or more), each of said K sequences being formed of N symbols (where N is an integer of [2] *1* or more)*, wherein at least two neighboring sequences of said K sequences are used for frequency-offset estimation*, wherein an auto-correlation function for said sequence of N symbols is in an impulse state*; and*

*said transmitter transmitting said packets*.

[2. A packet receiver that receives packets, each packet including a training portion and a data portion used to initialize said packet receiver, said training portion being formed by serially connecting K sequences (where K is an integer of 2 or more), each of said K sequences being formed of N symbols (where N is an integer of 2 or more), the packet receiver comprising:

a frequency-offset estimation means for estimating a frequency offset based on a phase difference between two neighboring sequences of K sequences of a received packet, each of said K sequences being formed of N symbols;

a frequency-offset compensation means for compensating a frequency offset contained in said received packet based on said frequency offset estimation; and a channel impulse response estimation means for estimating an impulse response of a channel based on an output for which the frequency offset is compensated.]

[3. The packet receiver defined in claim 2, wherein:

an auto-correlation function of said N symbol sequences is in an impulse state; and said channel impulse response estimation means comprises means for estimating a channel impulse response based on a sequence for which the auto-correlation function is in an impulse state, and a received training sequence.]

[4. The packet receiver defined in claim 2, wherein said frequency offset estimation means comprises:

a delay circuit for delaying said received packet by a transmission period of time of a sequence of N-symbol sequences;

a phase difference detection circuit for detecting a phase difference between an output of said delay circuit and said received packet;

an integrator for integrating a detection output of said phase difference detection circuit over a transmission period of time of a sequence of M symbols (where M is an integer of 2 or more); and a divider circuit for dividing an output of said integrator by a product of N and M.]

[5. The packet receiver defined in claim 2, wherein said impulse response estimation means outputs a channel impulse response estimation value after inputting a pulse representing that said frequency offset estimation means has completed frequency offset estimation.]

[6. A packet receiver for receiving packets, each of said packets including a training portion and a data portion used to initially set a receiver, said training portion being formed by serially connecting K sequences (where K is an integer of 2 or more), each of K sequences being formed of N symbols (where N is an integer of 2 or more), said packet receiver comprising:

a frequency offset estimation means for detecting a phase difference between a sequence received prior to NT (where T is a continuous time of one symbol) and a currently received sequence, and for estimating a frequency offset based on said phase difference;

a frequency offset compensation means for compensating said frequency offset by rotating the phase of a received signal in the frequency offset compensation direction based on a frequency offset estimation value; and a channel impulse estimation means for estimating an impulse response of a channel based on an output from an output for which the frequency offset is compensated.]

[7. The packet receiver defined in claim 6, wherein an auto-correlation function of said N symbol sequences is in an impulse state; and wherein said channel impulse response estimation means comprises means for estimating a channel impulse response based on a sequence in which the auto-correlation function is in an impulse state, and a received training sequence.]

[8. The packet receiver defined in claim 6, wherein said impulse response estimation means outputs a channel impulse response estimation value after inputting a pulse representing that said frequency offset estimation means has completed frequency offset estimation.]

[9. A packet receiving method for receiving packets, each of said packets including a training portion and a data portion to initially set a receiver, said training portion being formed by serially connecting K sequences (where K is an integer of 2 or more), each of said K sequences being formed of N symbols (where N is an integer of 2 or more), said method comprising:

estimating a frequency offset based on a phase difference between two neighboring sequences of K sequences of a received packet, each of K sequences being formed of N symbols;

compensating a frequency offset contained in said received packet based on a frequency offset estimation value; and estimating an impulse response of a channel based on a received packet of which the frequency offset is compensated.]

[10. The packet receiving method defined in claim 9, wherein said step of estimating an impulse response of said channel comprises estimating a channel impulse response by placing an auto-correlation function of said sequence of N symbols in an impulse state, and detecting a peak value of an autocorrelation value between a received signal and said sequence of N symbols.]

[11. The packet receiving method defined in claim 9, wherein said step of estimating an impulse response of said channel comprises the step of outputting a channel impulse response estimation value after frequency offset estimation has been completed.]

*12. A method of packet transmission in a transmitter, said packets each including a training portion and a data portion, the method comprising: said transmitter forming said training portion by serially connecting K sequences (where K is an integer of 2 or more), each of said K sequences being formed of N symbol(s) (where N is an integer of 1 or more), wherein at least two neighboring sequences of said K sequences are used for frequency-offset estimation; and*

*said transmitter transmitting said packets.*

*13. A packet transmitter comprising:*

*a packet configuring unit, each packet including a training portion and a data portion, that forms said training portion by serially connecting K sequences (where K is an integer of 2 or more), each of said K sequences being formed of N symbols (where N is an integer of 1 or more), wherein at least two neighboring sequences of said K sequences are used for frequency-offset estimation; and*

*a transmitting unit that transmits each said packet.*

*14. A packet receiver comprising:*

*a receiving unit that receives a packet;*

*a packet estimating unit, each packet including a training portion and a data portion, said training portion being formed by serially connecting K sequences (where K is an integer of 2 or more), each of said K sequences being formed of N symbols (where N is an integer of 1 or more), said packet estimating unit estimating frequency offset by using at least two neighboring sequences of said K sequences.*

*15. A method of receiving a packet with a packet receiver, the method comprising:*

*the packet receiver receiving a packet;*

*the packet receiver estimating the packet, each packet including a training portion and a data portion and formed that said training portion by serially connecting K sequences (where K is an integer of 2 or more), each of said K sequences being formed of N symbols (where N is an integer of 1 or more), the estimating step estimating frequency offset by using at least two neighboring sequences of said K sequences.*

*16. A communication system comprising:*

*a packet transmitter;*

*a packet receiver;*

*wherein said packet receiver comprises:*

*a receiving unit that receives a packet;*

*a packet estimating unit, each packet including a training portion and a data portion, said training portion being formed by serially connecting K sequences (where K is an integer of 2 or more), each of said K sequences being formed of N symbols (where N is an integer of 1 or more), said packet estimating unit estimating frequency offset by using at least two neighboring sequences of said K sequences.*

*17. The method according to claim 1, wherein the frequency offset is estimated based on a phase difference between neighboring sequences of the training portion.*

*18. The method according to claim 12, wherein the frequency offset is estimated based on a phase difference between neighboring sequences of the training portion.*

*19. The packet transmitter according to claim 13, wherein the frequency offset is estimated based on a phase difference between neighboring sequences of the training portion.*

*20. The packet receiver according to claim 14, wherein the frequency offset is estimated based on a phase difference between neighboring sequences of the training portion.*

*21. The method according to claim 15, wherein the frequency offset is estimated based on a phase difference between neighboring sequences of the training portion.*

*22. The communication system according to claim 16, wherein the frequency offset is estimated based on a phase difference between neighboring sequences of the training portion.*

* * * * *